United States Patent
Deshmukh et al.

(10) Patent No.: US 11,212,673 B2
(45) Date of Patent: Dec. 28, 2021

(54) SECURE PEER-TO-PEER COMMUNICATION OVER WIRELESS MESH NETWORKS

(71) Applicant: Landis+Gyr Innovations, Inc., Alpharetta, GA (US)

(72) Inventors: Pushpesh Kumar Deshmukh, Alpharetta, GA (US); Ashok Mahadevan, Alpharetta, GA (US); Timothy James Rutten, Staples, MN (US); Michael Gerard Demeter, Roswell, GA (US); John Bettendorff, San Francisco, CA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 0 days.

(21) Appl. No.: 16/837,294

(22) Filed: Apr. 1, 2020

(65) Prior Publication Data
US 2020/0228978 A1    Jul. 16, 2020

Related U.S. Application Data

(63) Continuation of application No. 16/226,842, filed on Dec. 20, 2018, now Pat. No. 10,645,576.

(51) Int. Cl.
*H04W 12/0471* (2021.01)
*H04W 12/06* (2021.01)
(Continued)

(52) U.S. Cl.
CPC ..... *H04W 12/0471* (2021.01); *H04L 63/0478* (2013.01); *H04L 63/0876* (2013.01);
(Continued)

(58) Field of Classification Search
CPC ........... H04W 12/0471; H04W 12/041; H04W 12/06; H04W 84/18; H04W 12/0433; H04L 63/0478; H04L 63/12; H04L 63/0876
(Continued)

(56) References Cited

U.S. PATENT DOCUMENTS 8,341,402 B2 *  12/2012  Han ................... H04L 9/0833
                                                   713/163
2004/0044891 A1  3/2004  Hanzlik et al.
(Continued)

FOREIGN PATENT DOCUMENTS

| EP | 1396979 A2 | 3/2004 |
| EP | 1826984 A1 * | 8/2007 ........... H04L 63/065 |
| EP | 3116196 A1 | 1/2017 |

OTHER PUBLICATIONS

Asabe et al., "The protocol for secure and fast transmission for cooperative group framework", IEEE, doi: 10.1109/IC4.2015.7375505, 2015, pp. 1-6. (Year: 2015).*
(Continued)

*Primary Examiner* — Peter C Shaw
(74) *Attorney, Agent, or Firm* — Kilpatrick Townsend & Stockton LLP

(57) ABSTRACT

Techniques for secure team-based communication on existing wireless mesh networks are disclosed. In an example, a first network node receives a network encryption key from a headend system. The first network node receives a sub-group encryption key that is unique to a sub-group of nodes, a sub-group identifier, and a sub-group node list that lists the sub-group of nodes associated with the sub-group identifier. The first network node generates an application layer message for a second node of the sub-group of nodes at an application layer. The first network node encrypts the application layer message using the sub-group encryption key.
(Continued)

The first network node generates a team packet that is addressed to a selected node and includes the encrypted application layer message and the sub-group identifier. The first network node encrypts the team packet using the network encryption key and transmits the encrypted team packet to the selected node.

17 Claims, 5 Drawing Sheets

(51) Int. Cl.
  *H04L 29/06* (2006.01)
  *H04W 12/041* (2021.01)
  *H04W 12/0433* (2021.01)
  *H04W 84/18* (2009.01)
(52) U.S. Cl.
  CPC ........... *H04L 63/12* (2013.01); *H04W 12/041* (2021.01); *H04W 12/0433* (2021.01); *H04W 12/06* (2013.01); *H04W 84/18* (2013.01)
(58) Field of Classification Search
  USPC ......................................................... 713/168
  See application file for complete search history.

(56) References Cited

U.S. PATENT DOCUMENTS

| | | | | |
|---|---|---|---|---|
| 2007/0274525 | A1* | 11/2007 | Takata | .................. H04L 63/065 380/270 |
| 2013/0014217 | A1* | 1/2013 | Yadav | ................. H04W 12/062 726/3 |
| 2015/0288690 | A1* | 10/2015 | Pal | ......................... H04L 9/3242 713/181 |
| 2016/0127386 | A1* | 5/2016 | Meredith | .............. H04L 63/101 713/168 |
| 2020/0169572 | A1* | 5/2020 | Jana | .................... H04L 63/1416 |

OTHER PUBLICATIONS

Gao et al., "A Secure Key Management Model for Wireless Mesh Networks", IEEE, doi: 10.1109/AINA.2010.110, 2010, pp. 655-660. (Year: 2010).*
Saxena et al., "Application Layer Encryption for Cloud", IEEE, doi: 10.1109/APSEC.2015.52, 2015, pp. 377-384. (Year: 2015).*
U.S. Appl. No. 16/226,842, Notice of Allowance, dated Jan. 2, 2020, 14 pages.
McDaniel et al., "Antigone: A Flexibe Framework for Secure Group Communication", Proceedings of the Usenix Security Symposium, Aug. 23, 1999, 15 pages.
PCT Patent Application No. PCT/US2018/066664 , International Search Report and Written Opinion, dated Sep. 4, 2019, 14 pages.

* cited by examiner

SECURE PEER-TO-PEER COMMUNICATION OVER WIRELESS MESH NETWORKS

CROSS-REFERENCE TO RELATED APPLICATIONS

This is a continuation of U.S. patent application Ser. No. 16/226,842 entitled "Secure Peer-to-Peer Communication Over Wireless Mesh Networks" filed Dec. 20, 2018, now issued as U.S. Pat. No. 10,645,576, the contents of which are incorporated herein by reference.

TECHNICAL FIELD

This invention relates generally to communication over networks. More specifically, but without limitation, this invention relates to secure application-layer peer-to-peer communication over wireless mesh networks.

BACKGROUND

Wireless mesh networks are formed by multiple wireless network nodes that are interconnected to form a mesh. Wireless mesh networks can be used for different applications such as smart metering in resource distribution systems. For example, by using wireless mesh networks, smart meters can transmit consumption information back to a headend system to help automate billing, reduce cost, and provide advanced analytics.

But while wireless mesh networks can enable secure network-level communication between all nodes on a network, wireless mesh networks do not facilitate secure messaging at the application-level between sub-groups of network nodes. Therefore, a communication that is intended only for a particular node can be read by other nodes. Other solutions, such as Virtual Private Networks (VPNs), provide secure network-level communication between arbitrary devices connected via a network, but not application-level communication to a sub-group of network nodes.

Accordingly, new solutions are needed.

SUMMARY

Certain aspects and features relate to a network that includes network nodes configured to transmit and receive network packets and team packets and a headend system communicatively coupled to one or more of the network nodes. The headend system is configured to perform various operations. The operations include sending and receiving network packets with the network nodes. The operations further include responsive to receiving a request to designate a first node of the network nodes and a second node of the network nodes as a sub-group of nodes, generating a sub-group encryption key that is unique to the sub-group of nodes and transmitting the sub-group encryption key and sub-group node list to the first node and the second node. Each of the network nodes is configured to communicate on the network.

The first node is further configured to perform a first set of operations. The first set of operations includes receiving the sub-group encryption key from the headend system. The first set of operations includes generating an application layer message for the second node. The first set of operations includes determining that the second node is in the sub-group of nodes. The first set of operations includes encrypting the application layer message using the sub-group encryption key. The first set of operations includes inserting the encrypted application layer message into a team packet, wherein a header of the team packet includes an identifier for the sub-group of nodes. The first set of operations includes transmitting the team packet to the second node. The second node is further configured to perform a second set of operations. The second set of operations includes receiving the sub-group encryption key from the headend system. The second set of operations includes receiving the team packet from the first node. The second set of operations includes examining the identifier for the sub-group of nodes in the team packet to determine whether to process the team packet. The second set of operations includes when the determination is to process the team packet, extracting the application layer message from the team packet. The second set of operations includes decrypting the application layer message using the sub-group encryption key.

These illustrative examples are mentioned not to limit or define the disclosure, but to provide examples to aid understanding thereof. Additional examples and further description are provided in the Detailed Description.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
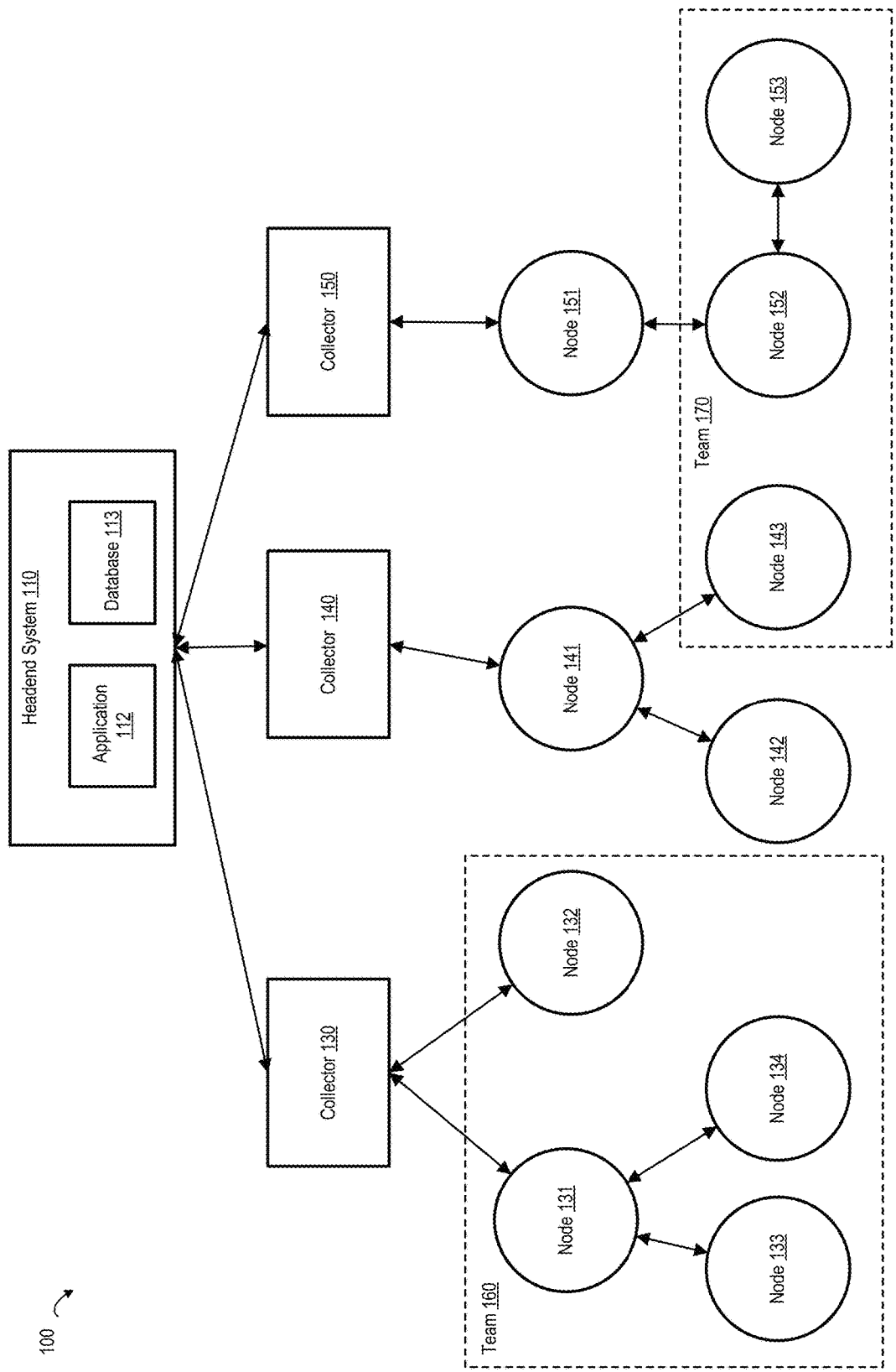
FIG. 1 illustrates a communications network, according to an aspect of the invention.

Aspects of the present disclosure relate to secure communications between network nodes in a designated group, or team, of network nodes. In an example, team communications are routed between team nodes over an existing network and can occur concurrently with other network-level communication. Encryption and authentication between team nodes is performed at the application layer of the network stack, in contrast to any encryption performed at the network layer. Because team communication occurs on an existing network, additional hardware is not typically required.

Peer-to-peer communication can be implemented on different types of networks, such as wireless mesh networks, other wireless networks such as ZigBee®, wired networks, or mixed wired-wireless networks. A mesh network can be a short-range wireless network with or without a central node. Mesh networks, such as Institute of Electrical and Electronics Engineers (IEEE) 802.15.4 networks, are wireless personal area networks that are typically short-range, low-bitrate, and self-identifying networks.

Example applications for peer-to-peer communication include (but are not limited to) Advanced Metering Infrastructure (AMI). Certain aspects enable secure communication between AMI devices such as smart meters, car chargers, batteries, or solar panels at one or more end user premises. By using security features such as encryption or message authentication, certain aspects help ensure that private data such as consumption or power usage characteristics (from which an individual's activities can be derived) remain secure. Other examples of information that can be securely exchanged are consumption, availability of a resource, pressure, temperature, or flow rate, load, or diagnostics. Additionally, commands that cause a device to perform an action based on this information can be securely exchanged and authenticated by using peer-to-peer communication.

The following non-limiting example is introduced for illustrative purposes. A wireless mesh network includes devices from a first end user premises and a second end user premises Examples of premises include households or businesses. The first end user premises includes a first smart meter and a load controller associated with an air conditioner. The first smart meter and the load controller are connected to the wireless mesh network. A smart meter located at a second user premises also connects to the mesh network.

To facilitate peer-to-peer private communication between devices associated with the first premises, the headend system creates a team consisting of the first smart meter and the load controller. The load controller can be connected to the electric grid and can control the air conditioner, by, for example, maintaining the load of the air conditioner within a threshold. The headend system generates a sub-group encryption key and sends the sub-group encryption key to the first smart meter and the air conditioner. In turn, the first smart meter uses the sub-group encryption key to encrypt an application-level message directing the air conditioner to shut off for a period of time. The first smart meter inserts the message into a team packet that includes an identifier that identifies the team. The message travels over the existing wireless mesh network, but because the contents of the message are encrypted with a key known only to the team, other devices such as the second smart meter, cannot decrypt the message. The load controller receives the message, decrypts the message using the sub-group encryption key, and shuts off the air conditioner for a period of time.

Turning now to the figures, FIG. 1 illustrates a communications network 100, according to an aspect of the invention. Communications network 100 can be any type of network such as wireless, wired, or a mixture thereof. Communications network 100 includes headend system 110, collector 130, collector 140, collector 150, and nodes 131-134, 141-143, and 151-153.

As depicted, communications network includes three wireless mesh networks: a first network that includes nodes 131-134 and communicates to headend system 110 via collector 130, a second network that includes nodes 141-143 and communicates to headend system 110 via collector 140, and a third network that includes nodes 151-153 and communicates with headend system 110 via collector 150. Headend system 110 can be configured to receive consumption and status information from nodes 131-134, 141-143, and 151-153 via collectors 130, 140, and 150. Collector 130, collector 140, and collector 150 are connected to one or more nodes in each respective wireless mesh network.

Any nodes can be configured to use secure peer-to-peer communication. In some cases, one or more of collectors 130, 140, or 150 can be a Personal Area Network (PAN) coordinator node. Other logical connections are possible. Additionally, mesh networks are adaptive, therefore the network topology can change over time, for example, if one node is added or removed from the network or if conditions cause the relationships between the nodes to change.

Examples of devices, or nodes, that can join the communications network are smart meters (AMI meters), water pumps, electric vehicle charger load controllers, air conditioner load controllers, in addition to industrial-type equipment such as industrial electric meters, capacitor banks, solar panels, wind generators, or thermostats. Nodes can gather information, take actions based on information, or be intermediate points that relay information to collectors 130, 140, or 150, or headend system 110.

Headend system 110 includes application 112 and database 113. Application 112 can perform functionality described herein such as determining a team, generating encryption keys, providing the encryption keys to the team devices, and so forth. Application 112 is executed by a computing device such as the computing device described with respect to FIG. 5. Application 112 can store encryption keys, team node information, or other information in database 113. Headend system 110 can also perform smart-metering functionality such as recording consumption information or diagnostic information.

Figure 2:
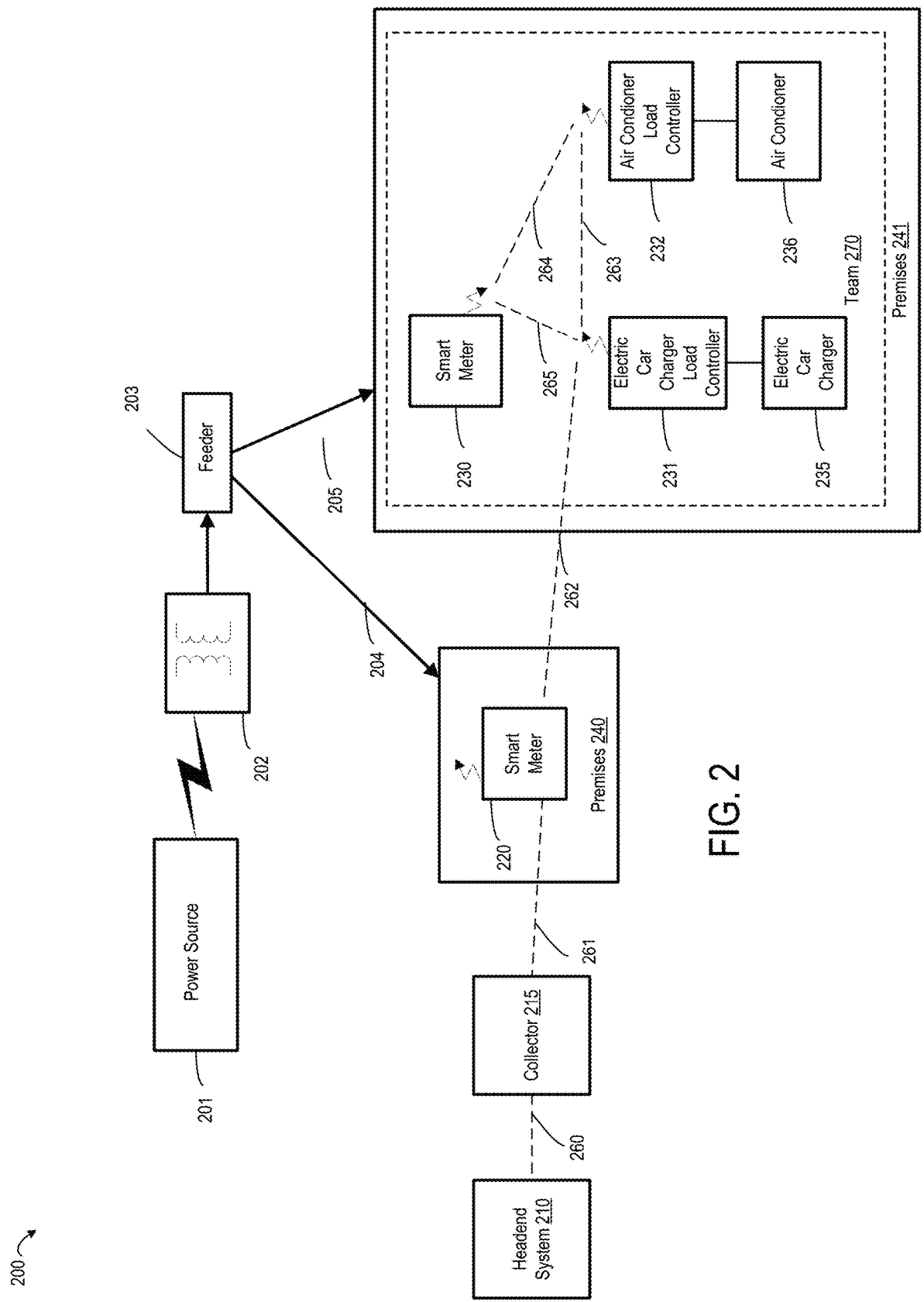
FIG. 2 illustrates an exemplary physical topology of a power distribution system with devices that implement peer-to-peer communication.
Figure 3:
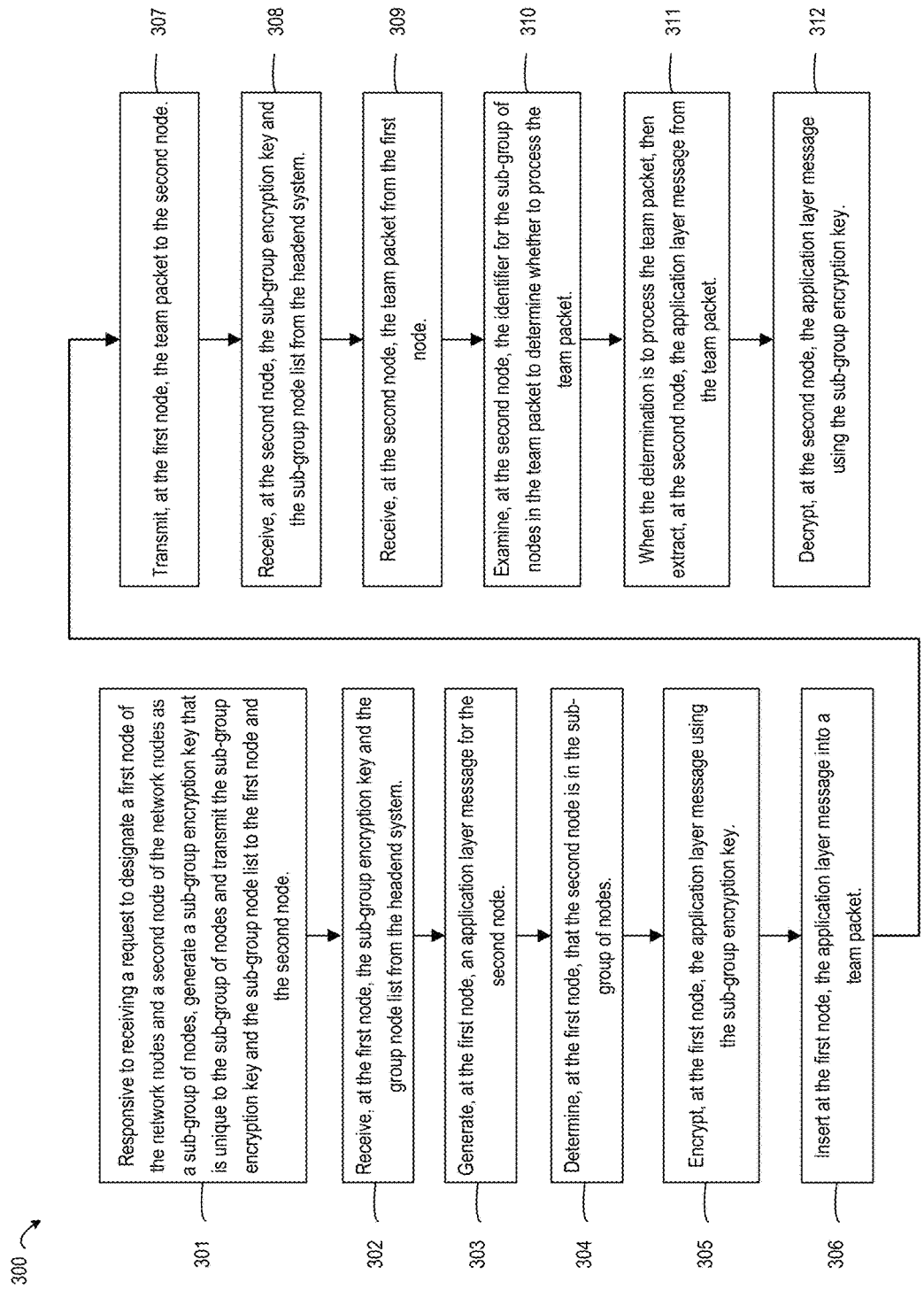
FIG. 3 is a flowchart illustrating an exemplary method for application-level peer-to-peer communication, according to an aspect of the invention.

As described further with respect to FIGS. 2 and 3, headend system 110 can create, update, or remove teams of nodes. A team includes two or more devices that can be configured to send and receive secure messages with each other within an existing network. As depicted in FIG. 1, the nodes are organized into two teams: team 160 and team 170. Team 160 includes nodes 131-134 and team 170 includes nodes 143, 152, and 153. As depicted, team 170 includes nodes that are connected to different connectors. Node 143 connects, via node 141, to collector 140, whereas node 152 connects, via node 151, to collector 150, and node 153 connects, via nodes 152 and 151, to collector 150.

Peer-to-peer communication can occur in conjunction with network communication. For example, node 131, in team 170, can communicate with node 134, also in team 170 by using peer-to-peer communication. Simultaneously, node 131 can communicate with node 134 over the communications network using traditional network communication. In this manner, peer-to-peer communication is kept secure whereas other communication can proceed normally.

FIG. 2 illustrates an exemplary physical topology of a power distribution system with devices that implement peer-to-peer communication. Resource distribution system 200 includes source 201, transformer 202, feeder 203, distribution lines 204-205, premises 240, premises 241, and headend system 210. Transformer 202 transforms a voltage output from source 201 to a suitable level for a feeder 203. Feeder 203 feeds distribution lines 204-205. In turn, distribution line 204 provides power to premises 240 and distribution line 205 provides power to premises 241.

Premises 240 and 241 can each include various devices. For example, premises 240 includes smart meter 220, and premises 241 includes smart meter 230, electric car charger load controller 231, electric car charger 235, air conditioner load controller 232, and air conditioner load controller 232. Some or all of the devices can connect to a wireless mesh network and a larger communications network. For example, electric car charger load controller 231 can connect to the electric grid and can control operation of the electric car charger 235. Similarly, air conditioner load controller 232 can connect to the electric grid and can control operation of air conditioner 236. As depicted, smart meter 230, electric car charger load controller 231, and air conditioner load controller 232 are connected to the mesh network. Electric car charger load controller 231 and air conditioner load controller 232 can connect to headend system 210 via smart meter 230 and smart meter 220.

Connections 261-265 illustrate a logical network topology for a mesh network. As can be seen, connection 260 connects headend system 210 to collector 215; connection 261 connects collector 215 to smart meter 220; wireless connection 262 connects smart meter 220 to electric car charger load controller 231; wireless connection 263 connects electric car charger load controller 231 to air conditioner load controller 232; wireless connection 264 connects smart meter 230 to air conditioner load controller 232; and wireless connection 265 connects smart meter 230 to electric car charger load controller 231. Connections can be wired, wireless, or a combination. In an example, connection 260 is a combination of wired and wireless and connections 261-265 are wireless.

Smart meter 230, electric car charger load controller 231, and air conditioner load controller 232 are organized into team 270. As depicted, network packets sent by smart meter 230, electric car charger load controller 231, and air conditioner load controller 232, pass through electric car charger load controller 231 to smart meter 220, which is located at a different premises. By using team communications, smart meter 230, electric car charger load controller 231, and air conditioner load controller 232 can communicate securely even in the presence of smart meter 220.

FIG. 2 depicts example devices configured to use team communications on a wireless mesh network. Other devices and applications are possible. In an example, a team of smart devices can operate to keep demand below a particular demand restriction. Each connected device can provide information about its consumption (e.g., kilo-watt hours consumed) to a smart meter, which can in turn, manage the consumption. For example, a smart meter can send a secure message to an air conditioner or dryer to cease operation for a period of time, or change duty cycle, in order to maintain total power consumption below a threshold amount.

In another example, smart devices in an industrial, e.g., commercial, setting can form a team and communicate securely. Examples of such devices can include line sensors, smart meters, or capacitor banks. If a smart meter detects that the industrial premises is using more reactive power than appropriate, then the smart meter can send a secure message to the capacitor bank to activate, thereby altering the power factor. Secure team communications ensures that other industrial customers or rogue devices cannot control power in an industrial setting and adversely affect productivity or equipment functionality.

Exemplary Method of Operation

Using team communications, a team, or sub-group, of devices can communicate securely over an existing communications network such as a wireless mesh network. The existing wireless mesh network can continue to be used for network-wide communication such as communicating consumption, billing, or diagnostic information with a headend system. In some cases, communications networks can be organized into different personal area networks. Team-based communication can operate within the personal-area network communications infrastructure. For example, a node that is part of a team can also be part of a personal area network.

FIG. 3 is a flowchart illustrating an exemplary method 300 for application-level peer-to-peer communication, according to an aspect of the invention. For illustrative purposes, FIG. 3 is discussed in conjunction with the resource distribution network discussed with respect to FIG. 2 and the data structures discussed with respect to FIG. 4.

More specifically, FIG. 3 is discussed with respect to a simplified communications network that includes headend system 210, smart meter 230 (a first node), and electric car charger load controller 231 (a second node), air conditioner load controller 232 (a third node), and smart meter 220. Headend system 210 initially forms a team of network nodes that includes smart meter 230 and electric car charger load controller 231. Each network node can send and receive team messages, but only those in the team can decrypt the contents of the application layer team message.

Headend system 210 can add or remove nodes from the team and perform other administrative functions such as updating the sub-group encryption key. But other configurations are possible. For example, a particular network node can be designated to perform these functions.

Figure 4:
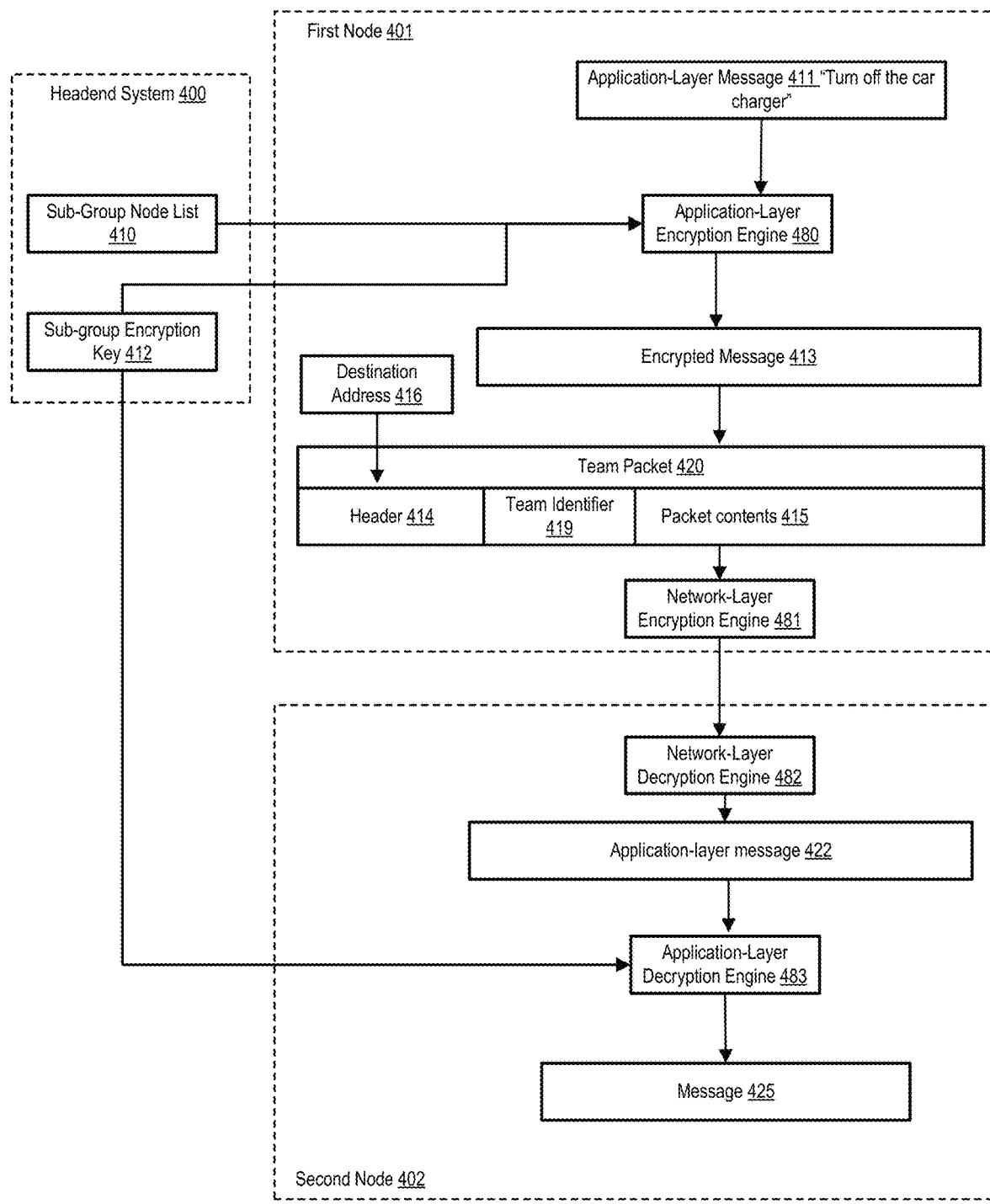
FIG. 4 is a diagram illustrating the generation of team packets, according to an aspect of the invention.

At block 301, method 300 involves responsive to receiving a request to designate a first node of the network nodes and a second node of the network nodes as a sub-group of nodes, generating a sub-group encryption key that is unique to the sub-group of nodes and transmitting the sub-group encryption key and sub-group node list to the first node and the second node. FIG. 4 illustrates the sub-group encryption key and the sub-group node list.

The headend can receive a request to form a sub-group from one of the individual nodes. For example, a smart meter can request that the headend form a sub-group that includes particular smart devices at the same premises. A request can include a list of one or more nodes that form part of the initial sub-group of nodes. The request can be received from an individual node that would like to be part of a sub-group or from an external device such as a controller device that connects to the headend system for management purposes.

FIG. 4 is a diagram illustrating the generation of team packets, according to an aspect of the invention. FIG. 4 depicts headend system 400, first node 401 and second node 402. Headend system 400 depicts data structures generated by headend system 210. First node 401 represents operations performed by the first node and associated data structures. Second node 402 represents operations performed by the second node and associated data structures. For illustrative purposes, first node 401 includes preparation of packets including encryption whereas second node 402 includes the decryption of packets. But each node in a team can perform encryption and decryption of team packets.

More specifically, headend system 400 generates sub-group node list 410 and sub-group encryption key 412. First node 401 includes application-layer decryption engine 480, and network layer encryption engine 481. First node 401 generates application-layer message 411, 422, destination address 416, encrypted message 413, and team packet 420. Team packet 420 includes one or more of header 414, team identifier 419, and packet contents 415. Second node 402 includes network layer decryption engine 482 and application layer decryption engine 483. Second node 402 generates application-layer message 422, and message 425.

In some cases, first node 401 generates destination address 416, which can be an identifier for second node 402. Upon receiving destination address 416, second node 402 determines that team packet 420 is intended for second node 402. In other cases, first node 401 can send team packet 420 to multiple destinations by specifying more than one node identifier in destination address 416. In additional cases, first node 401 does not send destination address 416 and all nodes in the sub-group and consequently, all nodes in the sub-group may read and process team packet 420.

Returning to FIG. 3, headend system 210 receives a request to add smart meter 230 and electric car charger load controller 231 to a team. In response, headend system 210 generates sub-group encryption key 412 and sub-group node list 410. Headend system 210 provides sub-group encryption key 412 and sub-group node list 410 to smart meter 230 and electric car charger load controller 231. Headend system 210 can store sub-group encryption key 412 and sub-group node list 410 in a memory or database, for example, database 113.

At block 302, method 300 involves receiving, at the first node, the sub-group encryption key from the headend system. Smart meter 230 receives sub-group encryption key 412 and sub-group node list 410 from headend system 210. Smart meter 230 can store sub-group encryption key 412 and sub-group node list 410 in a data structure or a database.

At block 303, method 300 involves generating, at the first node, an application layer message for the second node. Example application-layer messages activate or deactivate a resource in response to a maximum demand restriction or a power factor imbalance. Smart meter 230 generates application-layer message 411, which includes a message for electric car charger load controller 231 to turn off electric car charger 235 (for example due to a demand restriction).

At block 304, method 300 involves determining, at the first node, that the second node is in the sub-group of nodes. By searching sub-group node list 410, the first node determines that the sub-group also includes the second node.

At block 305, method 300 involves encrypting, at the first node, the application layer message using the sub-group encryption key. The first node uses application-layer decryption engine 480 to encrypt sub-group node list 410 and application-layer message 411. The application-layer decryption engine generates encrypted message 413. Different encryption protocols and key lengths can be used.

At block 306, method 300 involves inserting, at the first node, the application layer message into a team packet. Smart meter 230 inserts team identifier 419 into team packet 420. Team identifier 419 identifies the team that includes smart meter 230 and electric car charger load controller 231. Because multiple teams can operate on the network, different team identifiers can be used for each team. Additionally, smart meter 230 inserts destination address 416 into header 414. Destination address 416 includes an address, e.g. Media Access Layer (MAC) address, of electric car charger load controller 231.

Team packets differ from network packets in several respects. For example, team packet 420 can include an application-layer encrypted message that can only be read by nodes that are in the sub-group. In contrast, a network packet can be read by any node on the network that receives the network packet. For example, a network-level encryption key is shared with all nodes. A team packet is still routed on the network. As such, a team packet can also be encrypted at the network level.

Smart meter 230 can optionally perform network layer encryption of the team packet 420. If so, network layer encryption engine 481 encrypts team packet 420 before team packet 420 is transmitted on the network. Network layer encryption protocols and key lengths can be dictated by a particular wireless protocol being used.

At block 307, method 300 involves transmitting, at the first node, the team packet to the second node. Transmission can occur over the existing network, which can be wireless or wired. Depending on network configuration, a team packet can be routed via a headend system or collector. In some cases, transmission can occur directly from the first node to the second node and not pass through any other nodes. Continuing the example, smart meter 230 transmits team packet 420 to electric car charger load controller 231.

At block 308, method 300 involves receiving, at the second node, the sub-group encryption key and the sub-group node list from the headend system. Continuing the example, electric car charger load controller 231 receives the sub-group encryption key 412 and sub-group node list 410 from headend system 210. Electric car charger load controller 231 can store sub-group encryption key 412 and sub-group node list 410 in a data structure or a database.

In some cases, the operations described at block 308 and block 302 can occur at a different block in method 300. For example, smart meter 230 and electric car charger load controller 231 can receive sub-group encryption key 412 and sub-group node list 410 before smart meter 230 prepares a message for transmission. In this manner, all nodes in the sub-group are configured as part of the sub-group before any additional operations occur.

At block 309, method 300 involves receiving, at the second node, the team packet from the first node. Electric car charger load controller 231 receives team packet 420. If team packet 420 was encrypted at the network level by smart meter 230, then the second node decrypts team packet 420 using network layer decryption engine 482, outputs application-layer message 422, destination address 416, team identifier 419, application-layer message 422. Operations performed at block 309 can occur simultaneously with operations at block 308. For example, the sub-group encryption key 412, sub-group node list 410, and team packet 420 can be received concurrently.

At block 310, method 300 involves examining, at the second node, the identifier for the sub-group of nodes in the team packet to determine whether to process the team packet. Electric car charger load controller 231 verifies that the received identifier indicates the correct sub-group of nodes. If so, then electric car charger load controller 231 can process application-layer message 422. If the received identifier does not indicate the correct sub-group of nodes, then electric car charger 231 can cease to process team packet 420.

Additionally, upon receiving team packet 420, a particular node can determine whether team packet 420 is addressed to the particular node. Responsive to determining that team packet 420 is not addressed to the particular node, then the particular node can chose to ignore team packet 420.

In some cases, a particular node can be part of two sub-groups. If so, then team identifier 419 identifies the particular sub-group with which the received team packet 420 is associated.

At block 311, method 300 involves when the determination is to process the team packet, then extracting, at the second node, the application layer message from the team packet. Electric car charger load controller 231 extracts application-layer message 422 from team packet 420.

At block 312, method 300 involves decrypting, at the second node, the application layer message using the sub-group encryption key. Electric car charger load controller 231 decrypts application-layer message 422, obtaining message 425. Based on the contents of message 425, electric car charger load controller 231 reduces the load drawn by electric car charger 235. Method 300 can continue with the first and second nodes exchanging additional messages. For example, each node can perform one or more of steps 302-312.

Additionally, headend system 210 can add or remove nodes from the team. For example, headend system 210 receives a request to add air conditioner load controller 232 to the sub-group of nodes. Headend system 210 transmits sub-group encryption key 412 and sub-group node list 410 to air conditioner load controller 232. Air conditioner load controller 232 receives sub-group encryption key 412 and sub-group node list 410 from headend system 210. Smart meter 230 and electric car charger load controller 231 can communicate securely with air conditioner load controller 232. For example, electric car charger load controller 231 encrypts an application layer message using the sub-group encryption key and performs operations substantially similar to those described with respect to blocks 302-307.

In some cases, headend system 210 can update sub-group encryption key 412 based on a threshold amount of time passing, or based on changes in the nodes in the sub-group. For example, if a sufficiently long period of time has passed or if a node is added to the team, then headend system 210 can update the sub-group encryption key 412.

Headend system 210 can also remove a node from the team. For example, electric car charger load controller 231 may be removed from the team because the car charger is being sold to another owner. In response to receiving a request to remove electric car charger load controller 231 from the sub-group, headend system 210 removes the electric car charger load controller 231 from the sub-group node list. Headend system 210 sends an additional message to electric car charger load controller 231. When the second node receives the additional message, the second message causes electric car charger load controller 231 to delete the sub-group encryption key. In order to prevent electric car charger load controller 231 from communicating in the team if the electric car charger load controller 231 does not delete the sub-group encryption key, headend system 210 generates an additional sub-group encryption key and transmits the additional sub-group encryption key to smart meter 230 and air conditioner load controller 232.

In some cases, message authentication can be performed in addition to or instead of application-layer encryption of messages. Message authentication verifies that a message originated from a sender that is part of the team. In an example, headend system 210 generates a message authentication code and provides the code to each node in the team, e.g., smart meter 230 and electric car charger load controller 231. In turn, smart meter 230 and electric car charger load controller 231 each receive a copy of the message authentication code from the headend system. When sending team packets between team members, smart meter 230 and electric car charger load controller 231 each include the message authentication code in team packet 420. The team identifier can optionally still be included in team packet 420. When receiving team packet 420, a node verifies that the received message authentication code matches the copy of the message authentication code received from headend system 210. If the codes do not match, then the node can take an action such as discarding the team packet, or informing the headend system of the mismatch. Message authentication can be performed instead of or addition to application-level encryption.

In another aspect, headend system 210 can perform encryption using public key encryption. For example, each node on the network can have a public and a private key. Public keys can be exchanged between team members. Each message can be encrypted with the public key that matches the destination of the message.

In yet another aspect, in addition to exchanging public keys, individual nodes can verify the MAC address of a node from which a message was received by using digital signatures. For example, a receiving node can verify a received digital signature with a digital signature that is stored locally to ensure that the message actually originated from the expected source node. If the signature fails, then the receiving node can discard the packet.

Exemplary Computing Environment

Figure 5:
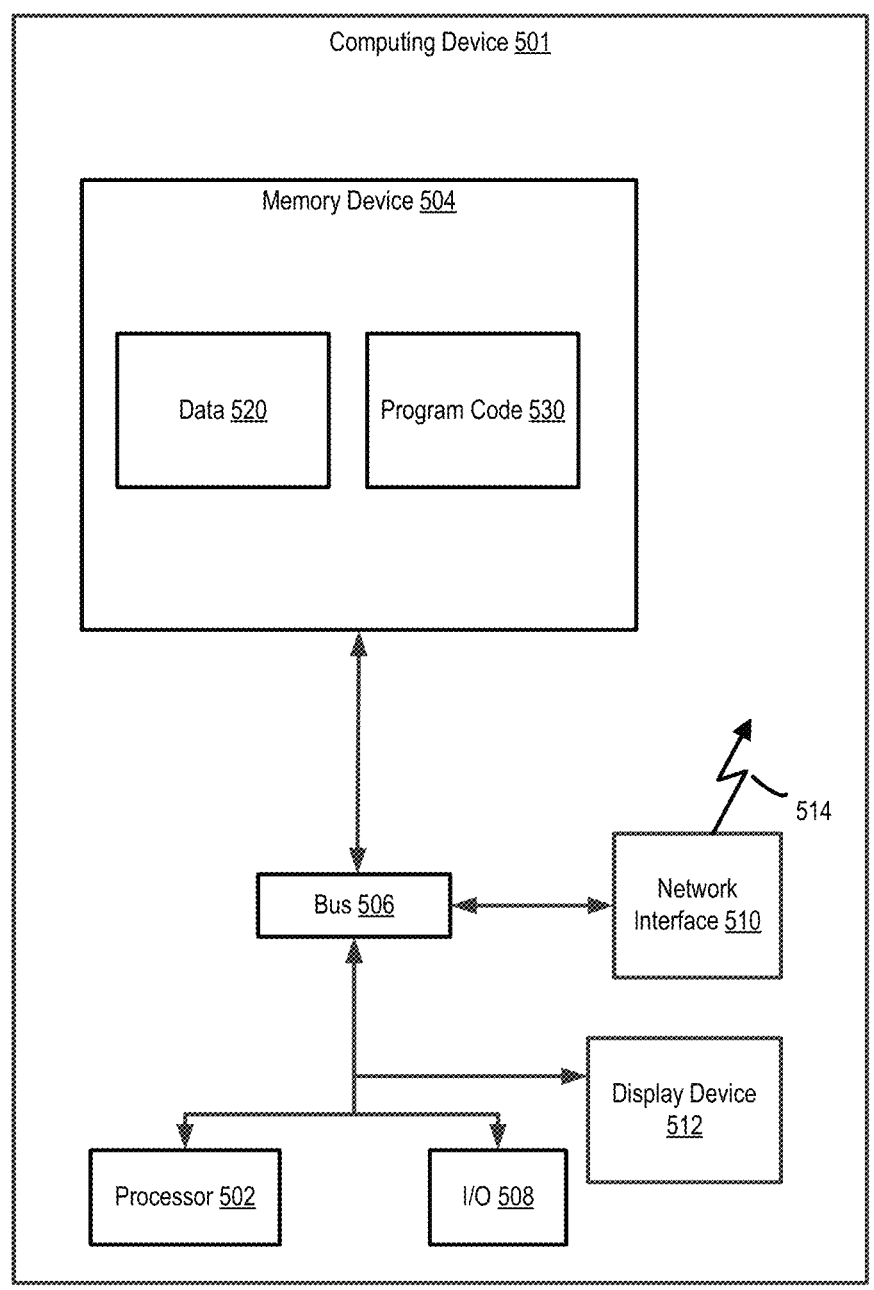
FIG. 5 illustrates an exemplary network device, according to an aspect of the invention.

FIG. 5 illustrates computing environment 500 used to implement certain functions of a network node, according to an aspect of the invention. Any suitable computing system or device may be used for performing the operations described herein such as implementing the functions of a headend system or a network node. The depicted computing device 501 includes a processor 502 communicatively coupled to one or more memory devices 504. The processor 502 executes computer-executable program code 530 stored in a memory device 504, accesses data 520 stored in the memory device 504, or both. Examples of the processor 502 include a microprocessor, an application-specific integrated circuit ("ASIC"), a field-programmable gate array ("FPGA"), or any other suitable processing device. The processor 502 can include any number of processing devices or cores, including a single processing device. The functionality of the computing device may be implemented in hardware, software, firmware, or a combination thereof.

The memory device 504 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a flash memory, a ROM, a RAM, an ASIC, or any other medium from which a processing device can read instructions. The instructions may include processor-specific instructions generated by a compiler or an interpreter from code written in any suitable computer-programming language, including, for example, C, C++, C #, Visual Basic, Java, or scripting language.

The computing device 501 may also include a number of external or internal devices, such as input or output devices. For example, the computing device 501 is shown with one or more input/output ("I/O") interfaces 508. An I/O interface 508 can receive input from input devices or provide output to output devices. One or more busses 506 are also included in the computing device 501. The bus 506 communicatively couples one or more components of a respective one of the computing device 501.

The computing device 501 executes program code 530 that configures the processor 502 to perform one or more of the operations described herein. For example, the program code 530 causes the processor to perform the operations described in FIG. 3.

The computing device 501 also includes a network interface device 510. The network interface device 510 includes any device or group of devices suitable for establishing a wired or wireless data connection to one or more data or communication networks. The network interface device 510 may be a wireless device and have an antenna 514. The computing device 501 can communicate with one or more other computing devices implementing the computing device or other functionality via a data network using the network interface device 510.

The computing device 501 can also include a display device 512. Display device 512 can be a LCD, LED, touch-screen or other device operable to display information about the computing device 501. For example, information could include an operational status of the computing device, network status, etc.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A method comprising:
   receiving, at a first node, a network encryption key from a headend system, wherein the network encryption key is used to encrypt messages between nodes on a wireless mesh network;
   receiving, at the first node, a sub-group encryption key that is unique to a sub-group of nodes, a sub-group identifier, and a sub-group node list that lists the sub-group of nodes associated with the sub-group identifier from the headend system, wherein the sub-group of nodes are nodes on the wireless mesh network;
   generating, at the first node, an application layer message for a second node of the sub-group of nodes at an application layer;
   encrypting, at the first node, the application layer message using the sub-group encryption key;
   generating, at the first node, a team packet that is addressed to the second node and includes the encrypted application layer message and the sub-group identifier;
   encrypting, at the first node, the team packet using the network encryption key;
   transmitting, at the first node, the encrypted team packet to the second node;
   receiving, at the first node, a second team packet from the second node; and
   responsive to identifying, at the first node, that the second team packet is (i) addressed to the first node and (ii) second team packet includes the sub-group identifier, then decrypting an additional application layer message in the second team packet using the sub-group encryption key.

2. The method of claim 1, further comprising:
   receiving a third team packet;
   determining whether the third team packet is addressed to the first node;
   when the third team packet is addressed to the first node, determining whether an additional sub-group identifier included in the third team packet corresponds to the sub-group identifier; and
   when the additional sub-group identifier does not correspond to the sub-group identifier, then ceasing to process the third team packet.

3. The method of claim 2, further comprising:
   generating an additional application layer message for a third node at the application layer, wherein the third node is excluded from the sub-group of nodes;
   encrypting an additional team packet that includes the additional application layer message for the third node using the network encryption key; and
   transmitting the encrypted additional team packet to the third node.

4. The method of claim 2, further comprising receiving, at the first node and from the headend system, a second sub-group encryption key that is unique to a second sub-group of nodes, a second sub-group identifier, and a second sub-group node list that lists the second sub-group of nodes associated with the second sub-group identifier, wherein the second sub-group of nodes omits at least one node from the sub-group of nodes.

5. The method of claim 2, further comprising:
   receiving a message authentication code; and
   transmitting the message authentication code with the encrypted application layer message.

6. The method of claim 2, further comprising:
   receiving a message authentication code from a headend system;
   receiving an additional message authentication code from a peer node of the nodes; and
   verifying the additional message authentication code against the message authentication code.

7. A network node comprising:
   a non-transitory computer-readable medium storing computer-executable program instructions; and
   a processing device communicatively coupled to the non-transitory computer-readable medium for executing the computer-executable program instructions, wherein executing the computer-executable program instructions configures the processing device to perform operations comprising:
      receiving a network encryption key from a headend system, wherein the network encryption key is used to encrypt messages between nodes on a wireless mesh network;
      receiving, a sub-group encryption key that is unique to a sub-group of nodes, a sub-group identifier, and a sub-group node list that lists the sub-group of nodes associated with the sub-group identifier from the headend system, wherein the sub-group of nodes are nodes on the wireless mesh network;
      generating an application layer message for a second node of the sub-group of nodes at an application layer;
      encrypting the application layer message using the sub-group encryption key;
      generating a team packet that is addressed to a second node and includes the encrypted application layer message and the sub-group identifier;
      encrypting the team packet using the network encryption key;
      transmitting the encrypted team packet to the second node;
      receiving a second team packet from the second node;
      determining whether the second team packet is addressed to the network node;
      when the second team packet is addressed to the network node, determining whether the second team packet includes the sub-group identifier; and
      when the second team packet includes the sub-group identifier, then decrypting an additional application layer message in the second team packet using the sub-group encryption key.

8. The network node of claim 7, wherein the operations further comprise:
   receiving a third team packet;
   determining whether the third team packet is addressed to the network node;
   when the third team packet is addressed to the network node, determining whether an additional sub-group identifier included in the third team packet corresponds to the sub-group identifier; and when the additional sub-group identifier does not correspond to the sub-group identifier, then ceasing to process the third team packet.

9. The network node of claim 7, wherein the operations further comprise:
generating an additional application layer message for a third node at the application layer, wherein the third node is excluded from the sub-group of nodes;
encrypting an additional team packet that includes the additional application layer message for the third node using the network encryption key; and
transmitting the encrypted additional team packet to the third node.

10. The network node of claim 7, wherein the operations further comprise receiving, at the network node, a second sub-group encryption key that is unique to a second sub-group of nodes, a second sub-group identifier, and a second sub-group node list that lists the second sub-group of nodes associated with the second sub-group identifier from the headend system, wherein the second sub-group of nodes omits at least one node from the sub-group of nodes.

11. The network node of claim 7, wherein the operations further comprise:
receiving a message authentication code; and
transmitting the message authentication code with the encrypted application layer message.

12. A non-transitory computer-readable medium embodying program code executable by a processing device, wherein when executed by a processing device, the program code causes the processing device to perform operations comprising:
receiving, at a first node, a network encryption key from a headend system, wherein the network encryption key is used to encrypt messages between nodes on a wireless mesh network;
receiving, at the first node, a sub-group encryption key that is unique to a sub-group of nodes, a sub-group identifier, and a sub-group node list that lists the sub-group of nodes associated with the sub-group identifier from the headend system, wherein the sub-group of nodes are nodes on the wireless mesh network;
generating an application layer message for a second node of the sub-group of nodes at an application layer;
encrypting the application layer message using the sub-group encryption key;
generating a team packet that is addressed to a second node and includes the encrypted application layer message and the sub-group identifier;
encrypting the team packet using the network encryption key;
transmitting the encrypted team packet to the second node;
receiving a second team packet from the second node;
determining whether the second team packet is addressed to the first node;
when the second team packet is addressed to the first node, determining whether an additional sub-group identifier included in the second team packet corresponds to the sub-group identifier; and
when the additional sub-group identifier of the second team packet does not correspond to the sub-group identifier, then ceasing to process the team packet.

13. The non-transitory computer-readable medium of claim 12, the operations further comprising:
receiving a third team packet;
determining whether the third team packet is addressed to the first node;
when the third team packet is addressed to the first node, determining whether the third team packet includes the sub-group identifier; and
when the third team packet includes the sub-group identifier, then decrypting an additional application layer message in the third team packet using the sub-group encryption key.

14. The non-transitory computer-readable medium of claim 12, the operations further comprising:
generating an additional application layer message for a third node at the application layer, wherein the third node is excluded from the sub-group of nodes;
encrypting an additional team packet that includes the additional application layer message for the third node using the network encryption key; and
transmitting the encrypted additional team packet to the third node.

15. The non-transitory computer-readable medium of claim 12, the operations further comprising receiving, at the first node, a second sub-group encryption key that is unique to a second sub-group of nodes, a second sub-group identifier, and a second sub-group node list that lists the second sub-group of nodes associated with the second sub-group identifier from the headend system, wherein the second sub-group of nodes omits at least one node from the sub-group of nodes.

16. The non-transitory computer-readable medium of claim 12, the operations further comprising:
receiving a message authentication code; and
transmitting the message authentication code with the encrypted application layer message.

17. The non-transitory computer-readable medium of claim 12, the operations further comprising:
receiving a message authentication code from a headend system;
receiving an additional message authentication code from a peer node of the nodes; and
verifying the additional message authentication code against the message authentication code.

* * * * *